(12) United States Patent
Horstmeyer et al.

(10) Patent No.: US 12,216,755 B2
(45) Date of Patent: Feb. 4, 2025

(54) SYSTEM AND METHOD TO OPTICALLY AUTHENTICATE PHYSICAL OBJECTS

(71) Applicant: Ramona Optics Inc., Palo Alto, CA (US)

(72) Inventors: Roarke Horstmeyer, Palo Alto, CA (US); Robert Horstmeyer, Palo Alto, CA (US); Mark Harfouche, Pasadena, CA (US); Ron Appel, Palo Alto, CA (US)

(73) Assignee: Ramona Optics Inc., Durham, NC (US)

( * ) Notice: Subject to any disclaimer, the term of this patent is extended or adjusted under 35 U.S.C. 154(b) by 1066 days.

(21) Appl. No.: 16/630,431

(22) PCT Filed: Jul. 11, 2018

(86) PCT No.: PCT/US2018/041534
§ 371 (c)(1),
(2) Date: Jan. 11, 2020

(87) PCT Pub. No.: WO2019/014284
PCT Pub. Date: Jan. 17, 2019

(65) Prior Publication Data
US 2020/0143032 A1 May 7, 2020

Related U.S. Application Data

(60) Provisional application No. 62/531,895, filed on Jul. 13, 2017.

(51) Int. Cl.
*G06F 21/44* (2013.01)
*G02B 21/06* (2006.01)
(Continued)

(52) U.S. Cl.
CPC ............. *G06F 21/44* (2013.01); *G02B 21/06* (2013.01); *G02B 21/367* (2013.01); *G06V 20/80* (2022.01); *H01S 5/183* (2013.01)

(58) Field of Classification Search
None
See application file for complete search history.

(56) References Cited

U.S. PATENT DOCUMENTS 6,970,236 B1 * 11/2005 Markantes ........... G07D 7/1205
283/91
10,002,277 B1 * 6/2018 Endress ................ H04L 9/3278
(Continued)

*Primary Examiner* — Hung Q Dang
(74) *Attorney, Agent, or Firm* — patent2ip; Tue Nguyen

(57) ABSTRACT

A system and method to verify the authenticity of a physical object, based on the efficient acquisition and digital post-processing of a large amount of optical data. An optical system, comprised of an array of microscope-type "micro-cameras" and a patterned illumination source, acquires spatial, spectral and angular information about the physical object in the form of micro-camera images. The set of all acquired images comprise one object dataset, which a post-processing system then digitally transforms into a multi-gigabyte set of semi-random keys. Authentication takes place at a later date following a challenge-and-response protocol. The high resolution (<15 μm) of the acquired data presents a significant challenge to attempted duplication of the physical object, and the large size (>1 Gigabyte) of the key set similarly prevents both physical and digital forgery attempts.

22 Claims, 9 Drawing Sheets

(51) Int. Cl.
*G02B 21/36* (2006.01)
*G06V 20/80* (2022.01)
*H01S 5/183* (2006.01)

(56) References Cited

U.S. PATENT DOCUMENTS

| | | | |
|---|---|---|---|
| 2007/0165208 A1* | 7/2007 | Cowburn | G03G 21/046 |
| | | | 356/71 |
| 2007/0192850 A1* | 8/2007 | Cowburn | G06V 20/80 |
| | | | 726/20 |
| 2007/0211318 A1* | 9/2007 | Miura | G03H 1/2286 |
| | | | 359/2 |
| 2010/0253782 A1* | 10/2010 | Elazary | G06V 10/145 |
| | | | 348/370 |
| 2016/0018656 A1* | 1/2016 | Nguyen | G06F 3/012 |
| | | | 345/8 |
| 2018/0004993 A1* | 1/2018 | McCloskey | G06K 5/02 |

* cited by examiner (a) Time and Location A: Object registration (b) Time and location B: Object verification

SYSTEM AND METHOD TO OPTICALLY AUTHENTICATE PHYSICAL OBJECTS

TECHNICAL FIELD

This invention relates to an imaging system that obtains a set of measurements of a physical object (such as a painting, drawing, work of art, or document, or three-dimensional objects such as coins, collectables or weapons), as well as a post-processing system that digitally transforms and stores the acquired measurements, which may then be used to verify the authenticity of the physical object at a later date.

BACKGROUND ART

The authentication of physical objects, such as artwork, currency notes, official documents, subject fingerprints, and even weapons and firearms remains an open challenge. A large but unknown number of forgeries continue to circulate through our financial system and the art world, for example, and their identification and detection is a critical problem to address. The large number of documented forgery attempts [Khandekar, Ragai], in combination with the expected large number of undocumented attempts and the multimillion dollar prices [Crilly] for individual paintings suggests this is a multibillion dollar issue. This invention is designed to address a sub-problem of the authentication challenge: determining that an object is unique. To meet this goal, the present invention will authenticate an object by determining that the object of interest is similar, with an extremely high degree of certainty, to an object that has been examined previously.

In general, there are two types of approach that aim to guarantee that an object is unique. First, there are "active" methods that are included within, require a modification of, or are attached to or are otherwise physically required to exist to ensure the uniqueness of the object in question. Examples of such active systems include attaching unique watermarks (e.g., on currency), using dynamically addressable watermarks [Fraser], DNA markers [Jung] and phosphor particles with optical reporters [Kwok] that can later be used to determine object uniqueness.

Second, there are "passive" methods that require no physical modifications to the object and are not attached to the object in any way. Passive methods typically acquire measurements about the object in question. The most long-standing passive method is an examination by a trained expert, where their opinion is taken as the measure of uniqueness. This method is commonly used with artwork [Dantzig]. Alternatively, a passive method may also rely on detailed measurements from a device. Examples include examining an object with a visible light microscope, spectroscopy, chemical analysis or radiometric (e.g. carbon dating) techniques [Riederer], and probing the artwork with terahertz radiation [Dong]. In the most basic form, passive optical methods can make an optical measurement and can directly compare this measurement to a previously made measurement. This has been achieved previously by scattering the coherent optical field from a laser off the surface of an object of interest [Colineau][Cowburn], examining the albedo of light as a function of angle [Rhoads], measuring the spatial frequencies of reflected light in the Fourier domain [Alfano], examining the hyperspectral reflectance of an object [Balas] and by directly imaging the object's surface structure [Sharma].

Alternatively, the system can make optical measurements and rely on computational post-processing of the measurements to achieve a more informed comparison, e.g. via a machine learning approach with low-resolution images [Elgammal] [Strezowski] [Hwang]. High-resolution optical images of an object, such as a work of art, can also be acquired by a standard microscope and subsequently analyzed, but the microscope will only be able to capture a very limited area of the object of interest within its field-of-view (FOV), (e.g., approximately a 1 $cm^2$ FOV at 5 µm resolution is common). A recent invention has shown that it is possible to acquire high-resolution (10 µm) images over an extremely large FOV (30 cm×30 cm) [Horstmeyer]. However, few inventions to date utilize wide field-of-view, high-resolution imaging measurements along with a post-processing protocol for object authentication.

There is a large body of work that utilizes non-imaging optical measurements for object authentication. The majority of this work comes from the general field within cryptography that studies physical unclonable functions (PUFs), otherwise referred to as physical one-way functions [Pappu1]. PUFs are complex physical objects that are extremely challenging to duplicate, require a very large number of measurements to digitally characterize, and have a large "challenge-response" space—meaning, a means to physically probe the object with a "challenge" and record a series of "response" measurements that depend both upon the object and the manner in which it is probed. Previous art has examined how volumetric scattering media can be used as an optical PUF [Pappu2], which can be attached to an object of interest and used as an "active" authentication method.

However, no inventions to date have considered measuring the optical surface properties of entire large works of art (up to square-meter surfaces) at microscopic (<10 µm resolution) to creates a multi-gigabyte to terabyte-sized dataset. This large dataset can then be used as the foundation for treating the entire object as a PUF, and applying a PUF-based cryptographic protocol to post-process this large dataset to verify object uniqueness. This strategy has the key advantage of offering a passive measure of authentication while at the same time offering the security advantages of an active PUF.

SUMMARY OF INVENTION

Other and further aspects and features of the invention will be evident from reading the following detailed description of the preferred embodiments, which are intended to illustrate, not limit, the invention.

Technical Problem

The passive authentication of the uniqueness of a physical object remains an open challenge. While there are many approaches whose measurements are sensitive to microscopic details from a small region of interest of an object, and others that can measure the properties of an entire object in a lower degree of detail (i.e., macroscopic detail) to ascertain object uniqueness, all prior work to date fails to examine the entire object or very large segments of an object at the microscopic level. Such an analysis requires an extremely large number of measurements to acquire information at sufficient detail from a large area (several billions of measurements or more). Most currently available technologies, for example standard optical microscopes, electron microscopes cameras, spectrometers and terahertz scanners, can acquire at most tens of millions of measurements (e.g., on a large CCD or CMOS detector), but they do not offer a way to efficiently acquire several orders of magnitude more information. This inability to acquire such a large dataset has prevented all prior work from achieving the two requirements of what is referred to as a "strong physical unclonable function," or strong PUF [Ruhrmair]: 1) that the physical object and method of measurement can guarantee object uniqueness with a high degree of confidence, and 2) that given the object for a sufficient period of time, an adversary interested in creating a replica can gain little insight in how to fool the authentication protocol into believing that they have the true object, when in reality they do not.

Solution to Problem

This invention provides an optical measurement system that captures a large number of optical measurements of a physical object (hundreds of millions to billion or more), and then digitally processes these measurements into a set of random cryptographic keys that can later be used to verify the uniqueness and authenticity of an object. In one preferred embodiment, the measurements are obtained with a novel "micro-camera array microscope and illumination" system (MCAMI) that is capable of acquiring gigapixels of high-resolution image data per second and can accommodate very large objects, such as large works of art that span up to one square meter or more.

After acquiring optical measurements, the invention then post-processes and securely stores these measurements as a large dataset "key". In one preferred embodiment, a large collection of dataset "keys" from many different physical objects may be kept at databases at select nodes that are trusted to ensure secure storage. In another preferred embodiment, the keys may be distributed across a network using distributed ledger technology (i.e., stored within a blockchain). In either case, keys may then be accessed at a later date to check whether future measurements are from the same physical object, or if they are from a different physical object and thus not authentic.

This access-and-check process uses a novel algorithm for key comparison and follows an authentication and verification security protocol that uses challenge-and-response key pairs, which we detail below. While recent work has investigated the use of optical inspection for e.g. artwork authentication (e.g., see [Hwang] and the relevant references within), little to no work has yet proposed a solution that can offer multiple terabytes of micrometer-scale information about the entire object of interest. Such a large size of information-rich data about each physical object, as well as its high resolution, are both prerequisites for the implementation of a strong physical unclonable function (PUF), which is a powerful security primitive connected to the challenge-and-response method for physical object authentication [Pappu1].

Advantageous Effects of Invention

An authentication protocol that uses a strong PUF offers an extremely high degree of physical security. Typically, a strong PUF system (e.g., a volumetric optical scattering material, or a small circuit) is attached to an object of interest (e.g., an ID card, a credit card, an important document) to help ensure object uniqueness. In the present invention, we treat the object itself as a strong PUF. This offers several key advantages. First, the authentication process shifts from using an "active" method to a "passive" method, which means that additional tags, labels or modifications do not need to be added or attached to the object of interest (e.g., nothing needs to be changed on an expensive work of art such as a rare statue, which should ideally not be modified at all). Second, attacks that are common to "active" methods (e.g., tag tampering, tag-switching) are not possible with the present invention. And third, by measuring the properties of the object itself across its entire surface at high detail, the present invention offers a means to monitor the microscopic variations of the object over time (e.g., due to aging or possible damage).

In addition, as one preferred embodiment of the optical measurement system, the MCAMI system can achieve an image resolution of approximately 5-15 µm across a field-of-view (FOV) of 30×30 cm without any movement or scanning (i.e., in one snapshot). This yields approximately 1 gigabyte of image data per snapshot, which is at least an order of magnitude higher than any alternative imaging approach currently available. When implemented with scanning, the MCAMI system can easily image up to 1 square meter surface areas. On top of this, the present invention also acquires multiple images of the sample under variably patterned illumination. The extremely large amount of image data (tens to hundreds of gigabytes) that the MCAMI system acquires the present invention meet the second requirement of a strong PUF—it makes it extremely challenging for an adversary to capture all of the required microscopic image data necessary to fully characterize the object in a limited amount of time. This provides a large degree of security to the object authentication process. In addition, this large amount of optical data provides a means to comprehensively record the state of an object at a certain period of time, which may be beneficial in a conservation setting or to monitor the aging and variation of various types of artwork, documents or other historical artifacts. Alternatively, the MCAMI can image smaller areas but at higher resolutions (sub-micrometer resolution if needed), to image a rile barrel, for example. In either mode of imaging at lower resolutions or higher resolutions, the MCAMI will still result in the desired gigapixel-sized images.

DESCRIPTION OF EMBODIMENTS

Figure 1:
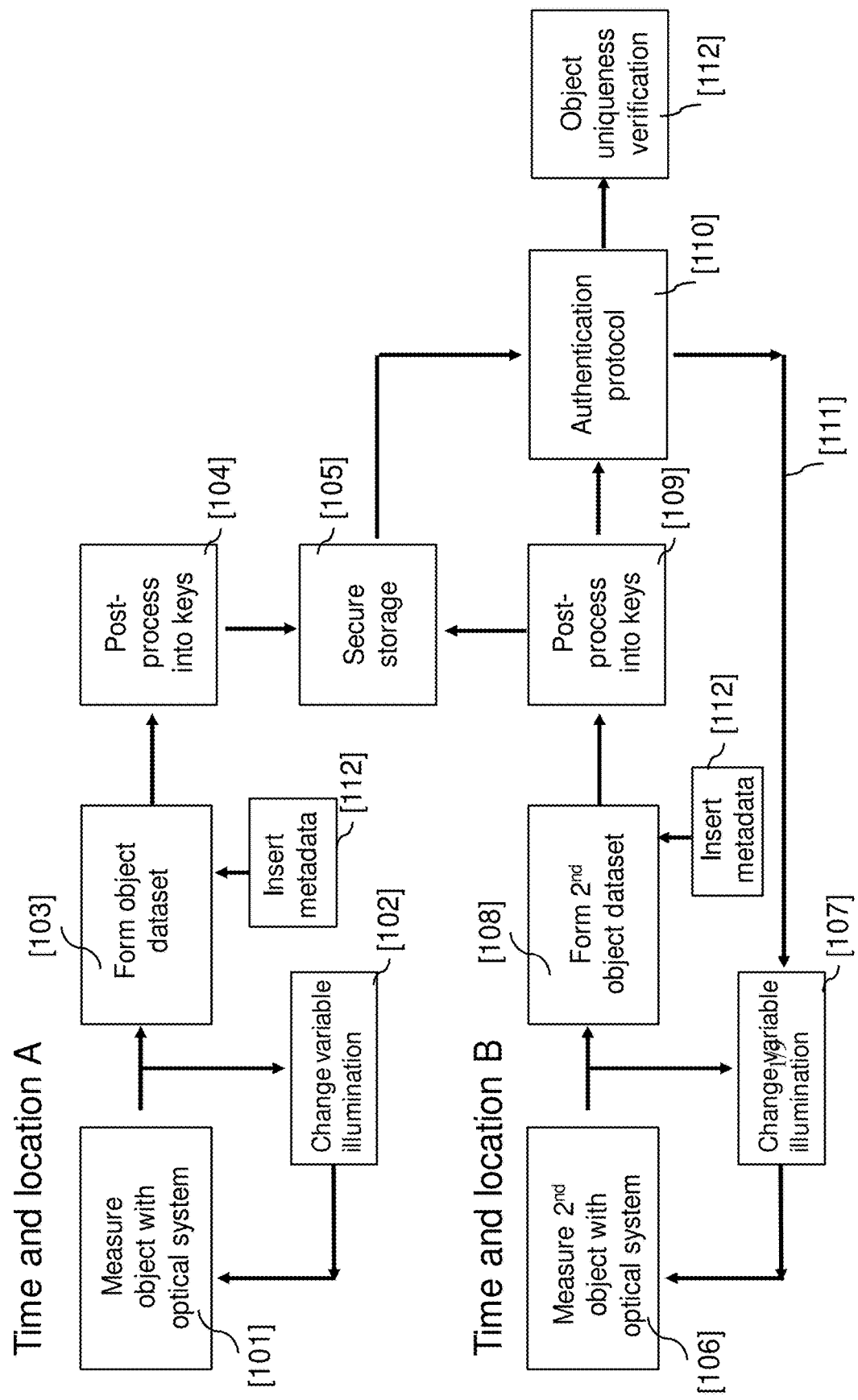
FIG. 1 is a flow diagram of the optical measurement and post-processing steps to authenticate object uniqueness with the present invention

Referring to FIG. 1, one embodiment of an object authentication process constructed in accordance with the current invention is now described. The first step in the object authentication process is the optical measurement of its surface properties. The optical measurement system [101] will be described as a multi-camera, multi-illumination system, and in particular an MCAMI system. In alternative embodiments, the optical measurement system [101] may take the form of other optical microscope technologies (e.g., a standard digital optical microscope, a light field optical microscope, or a holographic optical microscope). In still other embodiments, the optical measurement system may take the form of a parallelized non-microscopic imaging device with a variable illumination source (e.g., multiple cameras, or more than one optical coherence tomography system).

In any event, at a first time and location A, the optical measurement system will acquire multiple measurements of the object over both space and potentially variable illumination conditions. To change the illumination condition, the invention changes the optical radiation emerging from a variable illumination source [102] that is included with the optical measurement system. Variation can take the form of changing the intensity, location, combination of sources, phase, polarization, angle of illumination, or wavelength of the variable illumination source. This will subsequently change the optical radiation that it creates, which then changes what impinges upon the object and is then detected by the optical measurement system.

One or more measurements are acquired by the optical measurement system, digitized and then compiled into a dataset [103]. In one preferred embodiment, the illumination from the variable illumination source is varied between successive measurements. As an optional step in [112], metadata (e.g., time of imaging experiment, focus settings, conditions of object, location of object with respect to MCAMI, etc.) may be attached to the dataset. Next, this dataset is post-processed by a digital processing system [104]. The digital processing step will distill the dataset into one or more random cryptographic keys, which are then saved in a secure storage system [105] that may be accessed at a later time and/or a different location to help determine object uniqueness. The above three steps can be completed either on a personal computer, computer cluster, field-programmable gate array, a dedicated ASIC chip using random access memory (RAM) for storage or any other means to digitally compute and store the digitized optical information. Secure storage may be located on a hard-drive, database, or within FPGA memory, for example. Although the digital processing system [104] and secure storage [105] are described herein as being separate steps, it should be appreciated that portions or all functionality of the digital processing system [104] and secure storage [105] may be performed by a single computing device. Furthermore, although all of the functionality of the digital processing system [104] is described herein as being performed by a single device, and likewise all of the functionality of the secure storage [105] is described herein as being performed by a single device, such functionality each may be distributed amongst several computing devices. In relation to the secure storage of the secure keys generated in [104], this large set of keys can be encrypted using standard encryption algorithms, enabling the potentially large set of keys to be stored in an otherwise "unsecure" location, but with the ability of the owner to decrypt the keys using a much smaller key. Moreover, it should be appreciated that those skilled in the art are familiar with the terms "processor," "storage," and "encryption", and that they may be implemented in software, firmware, hardware, or any suitable combination thereof.

At a later time and/or location B, a similar process as outlined above may be performed to capture multiple optical measurements from a second object of interest [106] over time, where a patterned illumination source is varied between each set of measurements [107]. This results in a second dataset [108], which is then post-processed into one or more cryptographic keys [109]. In one embodiment, the same optical measurement device and variable illumination source as used for the first object may be used to acquire the second dataset for the second object. In a second embodiment, a different yet similarly designed optical measurement device and variable illumination source may be used to acquire the second dataset for the second object. For example, the first dataset of object 1 may be acquired by an MCAMI system in location A, and the second dataset of object 2 may be acquired by a different MCAMI system, but of similar design, in location B. In a third embodiment, a differently designed optical measurement device and variable illumination source may be used to acquire the second dataset of object 2. For example, the first dataset of object 1 may be acquired by an MCAMI system in location A, and the second dataset of object 2 may be acquired by a digital optical microscope with a variable illumination source in location B. In the first two embodiments, less post-processing will be required to ensure that the structure of the first dataset acquired at time/location A matches the structure of the second dataset acquired at time/location B (as compared to the third embodiment). Nevertheless, as detailed later, it will still be possible to directly compare the first and second dataset to test if object 1 and object 2 are the same object.

In any event, after acquiring optical measurements and forming a dataset, the second dataset is then post-processed to form a second set of random cryptographic keys in step [109]. Post-processing for the second set of random cryptographic keys can follow the same post-processing steps or different post-processing steps as those used for the first set of random cryptographic keys. In either case, after creating the second set of random cryptographic keys, these keys can then be compared to one or more of any other set of random cryptographic keys that have been created via the same process described above (optical measurement, dataset creation, key formation). Comparison is achieved via an authentication protocol. FIG. 1 shows the secure storage of a first set of random cryptographic keys from time/location A and a second set of random cryptographic keys from time/location B, but we note that there will typically be many thousands of random cryptographic key sets that will be securely stored from previous optical measurements.

Referring to FIG. 1, the next step in the flow diagram is to apply an authentication protocol in step [110] to compare the second set of random cryptographic keys to one or more sets of previously acquired and securely stored random cryptographic keys in [105]. This comparison is performed to verify object uniqueness. In one preferred embodiment, the authentication protocol is a security protocol that uses fuzzy commitment [Dodis] to test whether the cryptographic keys associated with two or more noisy datasets are sufficiently similar to verify object uniqueness. In a second preferred embodiment, the authentication protocol is a PUF-based security protocol that uses challenge-response pairs to ensure object uniqueness. In this embodiment, it is possible for the security protocol to request additional optical measurements from the second measurement device at time/location B using a specified form of patterned illumination via an electronic signal [111]. The additional optical measurements are then formed into a dataset, post-processed into keys and then once again input into the authentication protocol to attempt to verify object uniqueness in step [110].

The final output of the authentication protocol in step [112] can take the form of a confidence score that specifies what confidence level one can use to describe object 2, measured at time and location B, as the same object or not with respect to object 1. The confidence score can also be used to compare object 2 to any other object that has been previously measured and has their associated keys stored within the secure storage unit in [105]. Additional optical measurements can be requested via an electronic signal [111] and then obtained and processed by the authentication protocol one or more times as needed to ensure a user-defined level of confidence in object uniqueness. The remainder of this section provides further details about each step of this invention.

A. Optical Measurement with the MCAMI System

Figure 2:
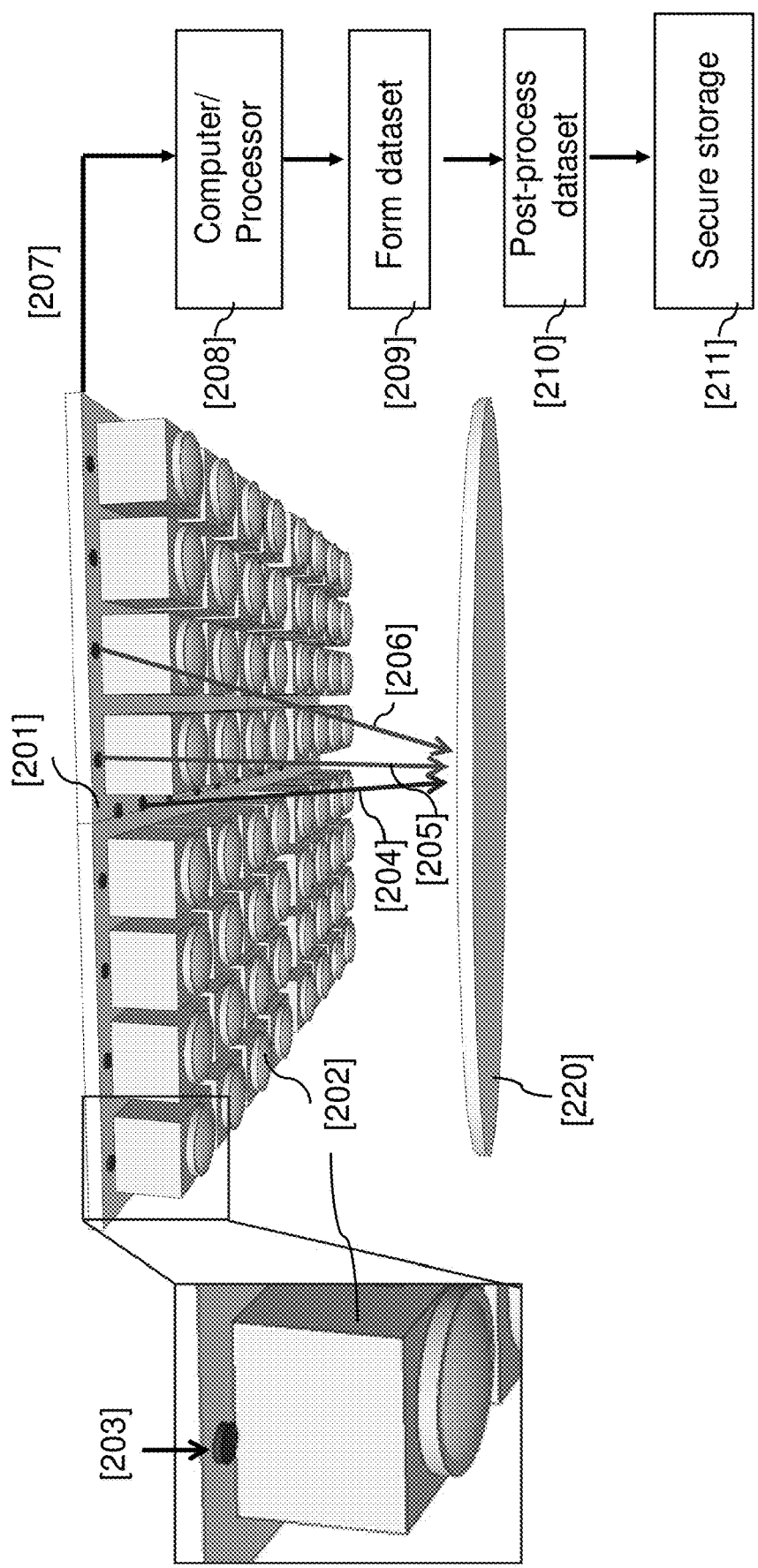
FIG. 2 is a top-and-side view of one embodiment of the optical measurement system used by the present invention (the MCAMI system)

In one preferred embodiment, the present invention captures optical measurements using a type of optical system referred to here as an MCAMI system. With reference to FIG. 2, the MCAMI system [201] is comprised of an array of more than one digital micro-camera [202], as defined below, and a set of more than one illumination sources [203] arranged in an array, as defined below. The illumination sources and micro-cameras are physically connected within a single mounted system and are arranged to be able to illuminate and image as much surface area of an object of interest as possible under reasonable design constraints. For example, for imaging objects that take the form of papers-sized documents, the MCAMI system's illumination sources and micro-cameras will be able to illuminate and image a surface area of approximately 8.5×11 inches. To image medium-sized paintings, the MCAMI system's illumination sources and micro-cameras will be able to illuminate and image a surface area of approximately 40×40 cm. To image rifle barrels, the imaged area will be approximate 2 cm×50 cm and so on. The MCAMI system geometry may be alternatively designed or additionally tuned to measure any type of object of interest whose surface profile does not rapidly vary in an unpredictable manner.

To form an image, a particular subset of the illumination sources may be activated to illuminate the sample with a particular pattern of spatial, angular and variable wavelength light. In reference to FIG. 2, three different illumination sources are activated to illuminate the sample from three different directions, as marked by rays [204], [205] and [206]. In practice, more than 3 illumination sources may be activated simultaneously—3 are highlighted here for the sake of brevity.

Light from this subset of illumination sources then reflects off of the object of interest [220] (also sometimes referred to as "the sample") and enters one or more of the micro-cameras within the micro-camera array. The image data from one or more of the micro-camera sensors is acquired in parallel and fed to a computer or a processing unit [208] via an electronic signal [207], which can be comprised of one or more USB cables, PCIe cables, Ethernet cables, or wires within a PCB board, for example. The illumination source activation and image acquisition process is repeated one or more times using a different subset of illumination sources for each acquisition, as diagrammed in FIG. 1. After acquiring a sufficient number of optical measurements from the object, the acquired data is formed into a dataset [209]. A post-processing algorithm then processes the dataset into one or more random cryptographic keys in step [210], and these keys are then securely stored for later use in step [211].

B. The MCAMI System

Figure 3:
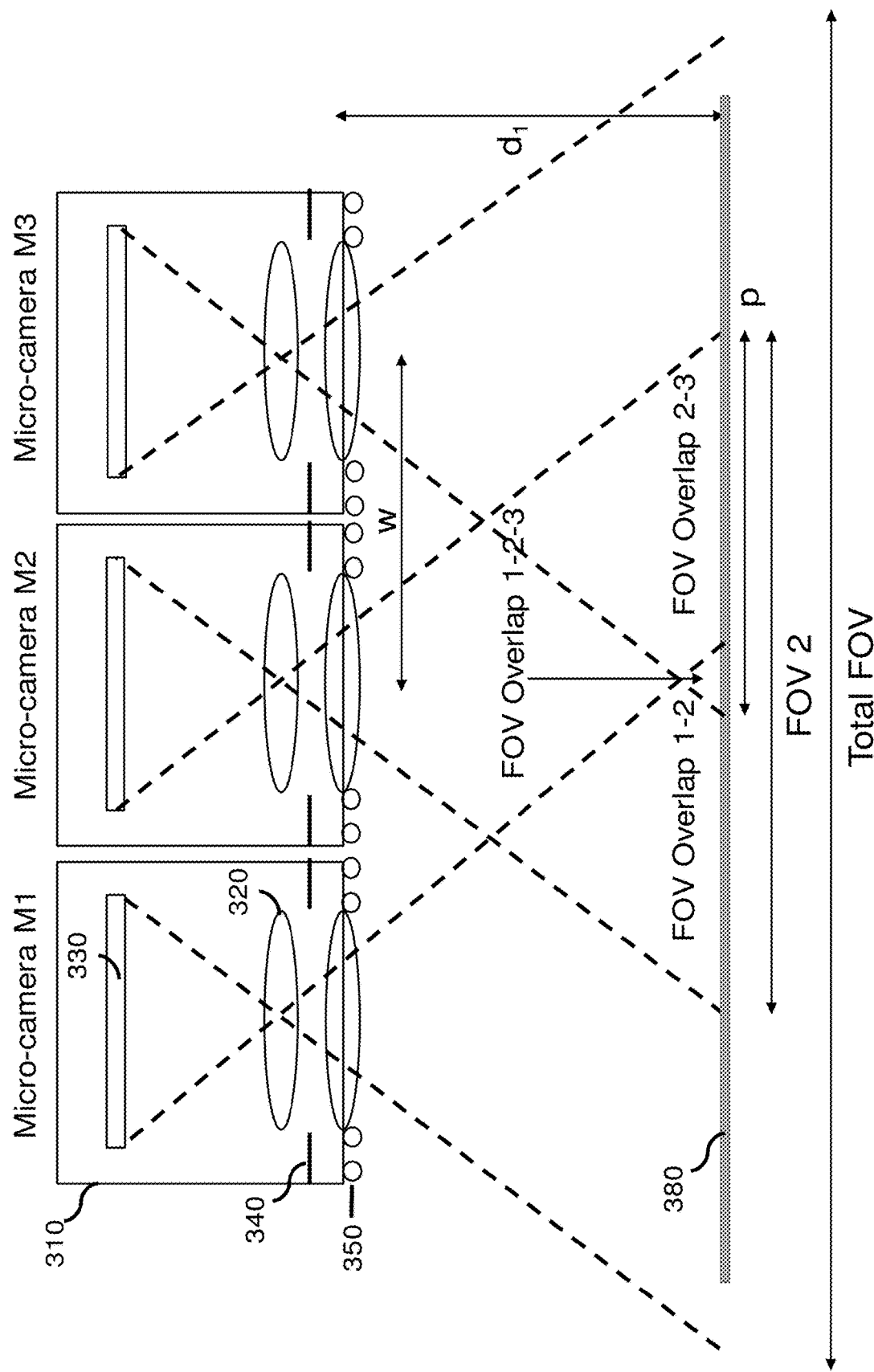
FIG. 3 is a side view of one section of one embodiment of the optical measurement system (the MCAMI system) used to image a contiguous field-of-view

The MCAMI system contains one or more micro-cameras that are physically and attached and arranged into an array. In FIG. 2, the MCAMI system contains 64 micro-cameras arranged in a square array, for example, although any number of more than one micro-camera may be arranged in a square or non-square array. A side-view sketch of three example micro-cameras is in FIG. 3. Each digital micro-camera is an optical unit that is comprised of a camera body (FIG. 3, 310), a lens (FIG. 3, 320), a digital detector (FIG. 3, 330) and an aperture stop (FIG. 3, 340). This aperture stop may take the form of a patterned mask or may comprise a clear aperture. The lens images a portion of the sample of interest onto the detector, which then detects and digitizes the intensity of the incident light. Each micro-camera in the array images a unique portion of the sample. Micro-cameras are placed adjacent to one another to form an array such that the imaging field-of-view (FOV) of each micro-camera is unique. The array may take a flat or curved form, may be a rectangular or hexagonal grid, or may be a linear array of cameras, and may be contain anywhere between 3 and 1000 or more micro-cameras. In one preferred embodiment, one or more illumination sources [350] are attached to the same physical mount that holds the micro-cameras.

In one embodiment, referred to as the continuous MCAMI embodiment, the FOV of each micro-camera in the array may overlap with the FOV of immediately adjacent micro-cameras, such that light from every point of a continuous object surface passes through at least one of the lenses of the micro-camera array. This scenario is shown in FIG. 3, where sample-camera distance marked as $d^1$ is sufficiently large and the inter-micro-camera distance marked as w is sufficiently small to enable a continuous FOV. For example, in one variation, $d^1$ may take the value of 12 cm and w may take the value of 18 mm and the lens focal length for each micro-camera may take the value of 25 mm and the lens diameter for each micro-camera may take the value of 9 mm to image a continuous FOV. Other embodiments besides this example embodiment are possible. The "FOV Overlap 1-2" and "FOV Overlap 2-3" regions in FIG. 3 denote portions of the sample that are imaged by 2 micro-cameras simultaneously, and the "FOV Overlap 1-2-3" region denotes a portion of the sample that is imaged by 3 micro-cameras simultaneously. Here, for example, the FOV of micro-camera 2 is of size TOV-2' marked in FIG. 3, and the size of the overlap between the FOVs from micro-camera 2 and 3 is of size 'p' marked in FIG. 3. In the continuous MCAMI embodiment, it is possible to capture optical measurements from a continuous area of the object [380] in a single snapshot from each micro-camera in the array. If the object is the same size or smaller than the Total FOV of the MCAMI system as marked in FIG. 3, then no mechanical scanning is needed to capture measurements from its entire surface area. If the object is larger than the Total FOV, then the object can be scanned in large steps to capture measurements from its entire surface. A continuous MCAMI embodiment may enable rapid data acquisition from a large area. For example, in one variation, the MCAMI system may contain 96 micro-cameras that each contain a 10-megapixel sensor, which yields 0.96 gigapixels per snapshot from a continuous sample area.

Figure 4:
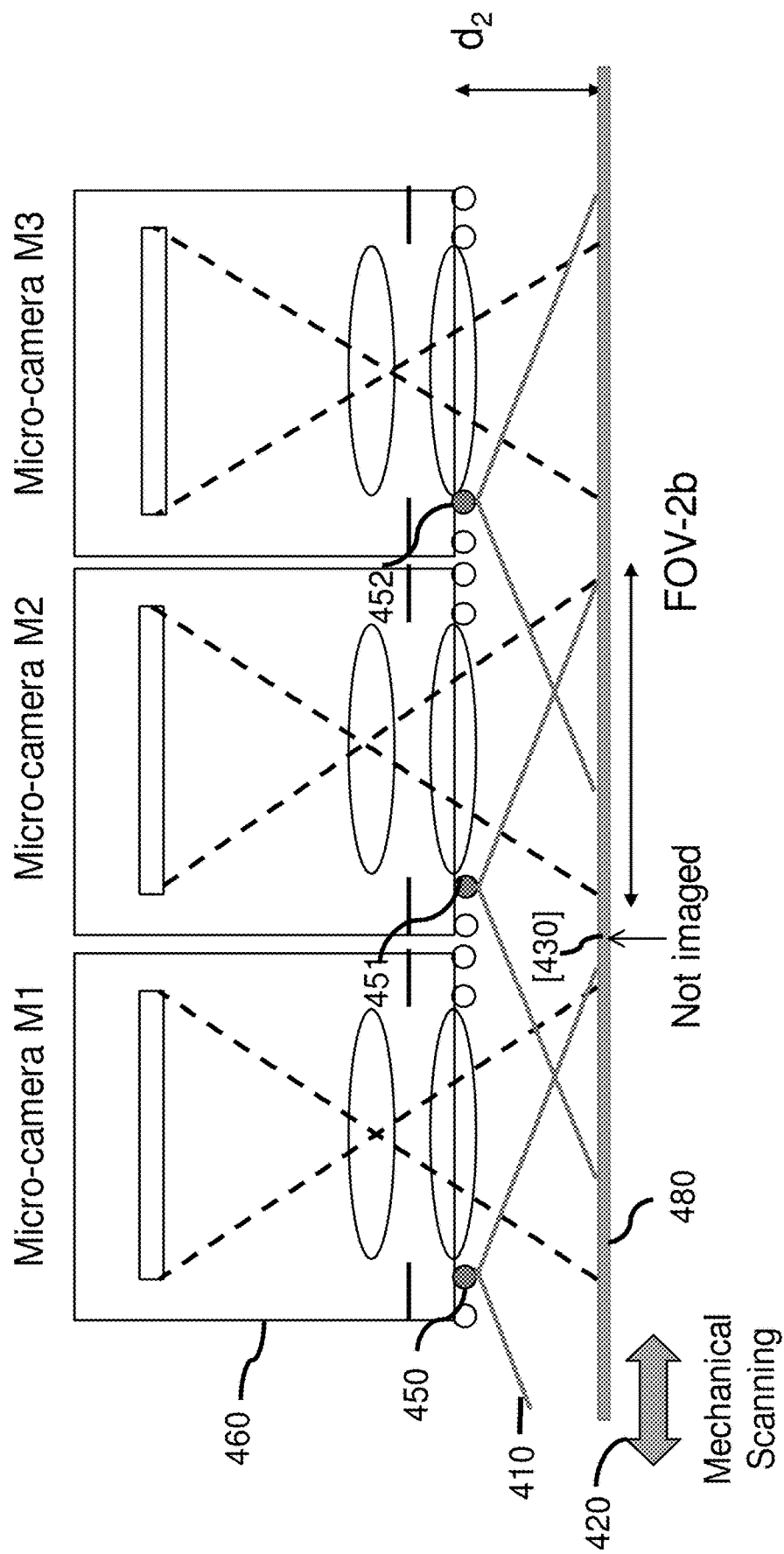
FIG. 4 is a side view of one section of one embodiment of the optical measurement system (the MCAMI system) used to image a non-contiguous field-of-view

In a second preferred embodiment for the MCAMI system, the FOV of each micro-camera in the array may not overlap with the FOV of immediately adjacent micro-cameras. This non-continuous MCAMI embodiment is shown in FIG. 4, where sample-camera distance $d_2$ is now smaller than $d_1$ for the same micro-camera array setup. This results in a reduced FOV for each micro-camera in the array as compared to the FOV for each micro-camera in the continuous MCAMI embodiment in FIG. 3. For example, the FOV for micro-camera 2 in the non-continuous MCAMI embodiment, marked as TOV-2b' in FIG. 4, is now smaller than the FOV for the same micro-camera in the continuous MCAMI embodiment in FIG. 3, marked 'FOV-2'. The non-continuous MCAMI embodiment in FIG. 4 may offer higher resolution than the embodiment in FIG. 3, but may require mechanical scanning [420], of either the object [480] or the micro-camera array body [460] to measure from the entire object surface, as certain object areas such as marked by [430] are not imaged by any micro-camera without scanning. For example, for one variation of a non-continuous MCAMI system with the same example parameters as the example continuous MCAMI system in FIG. 3, but with the working distance $d_2$ now equal to 4 cm instead of 12 cm, the FOV of each micro-camera will reduce roughly by a factor of 3 in each dimension, but the resolution of the images will increase from approximately 10 μm to 3.5 μm. This resolution increase may offer more microscopic information about the object of interest, but at the expense of needing mechanical scanning to capture measurements from its entire surface.

FIG. 4 also diagrams how one particular illumination source pattern illuminates the sample. The illumination sources marked [450], [451] and [452] are turned on such that they emit light from a particular set of angles that reflects off the sample from a certain spatial area. In addition, a single MCAMI system may be modified to work in either a continuous (FIG. 3) or non-continuous (FIG. 4) imaging configuration, by varying the position of each lens in the micro-camera array and moving the sample to the correct plane of focus. One or more non-continuous images, which when compiled together do not fully cover the entire surface of the object, can still be used for authentication purposes, so long as a sufficient number of image measurements are obtained (i.e., hundreds of millions to billions of pixel measurements).

The resolution of the micro-camera array is in the microscopic regime (approximately 10 μm or less). This level of microscopic resolution enables our authentication process to reach a higher level of accuracy than other approaches based on an image taken by a single camera or a laser-scanning system, for example, which are typically limited to 30 μm resolution or more. A second benefit of the micro-camera array over a single camera is the ability to extract 3D information about the surface profile of the sample from overlapping FOV areas. In the area marked "FOV Overlap 1-2" in FIG. 2, for example, where micro-camera 1 and 2 both image the same sample locations, the same type of image data that is input into a stereo-vision algorithm for a 3D image reconstruction is captured. Here, however, the same data is used to generate a dataset that aims to fully characterize the surface of objects at high resolution to aid in object authentication.

C. The Variable Illumination Source

The present invention uses a variable illumination source that is comprised of more than one illumination source as marked in FIG. 2, 203, FIG. 3, 350 and FIG. 4, 450-452, for example. In one preferred embodiment, the variable illumination source is attached to the micro-camera array. Each illumination source may take the form of a light-emitting diode, a laser diode, a vertical-cavity surface emitting laser, or any other type of electronically controlled compact light source, for example. The sources are individually addressable and are tuned in intensity and/or wavelength via an electric signal. The emission spectrum of the illumination sources can range from the ultraviolet to the visible and into the infrared spectrum. In one implementation, the illumination sources emit light with a variety of emission spectra. For example, a subset of the illumination sources in the illumination array may emit light within the spectral range of 400 nm-420 nm, while another subset may emit light within the spectral range of 420-440 nm, while another subset may emit light within the spectral range of 440-460 nm, and so forth up to a wavelength of approximately 1 μm. In a second implementation, each single illumination source may have several different spectral "active areas", such as a red-green-blue LED, and each spectral band may be activated in sequence to illuminate and capture the multispectral content of the sample.

Figure 5:
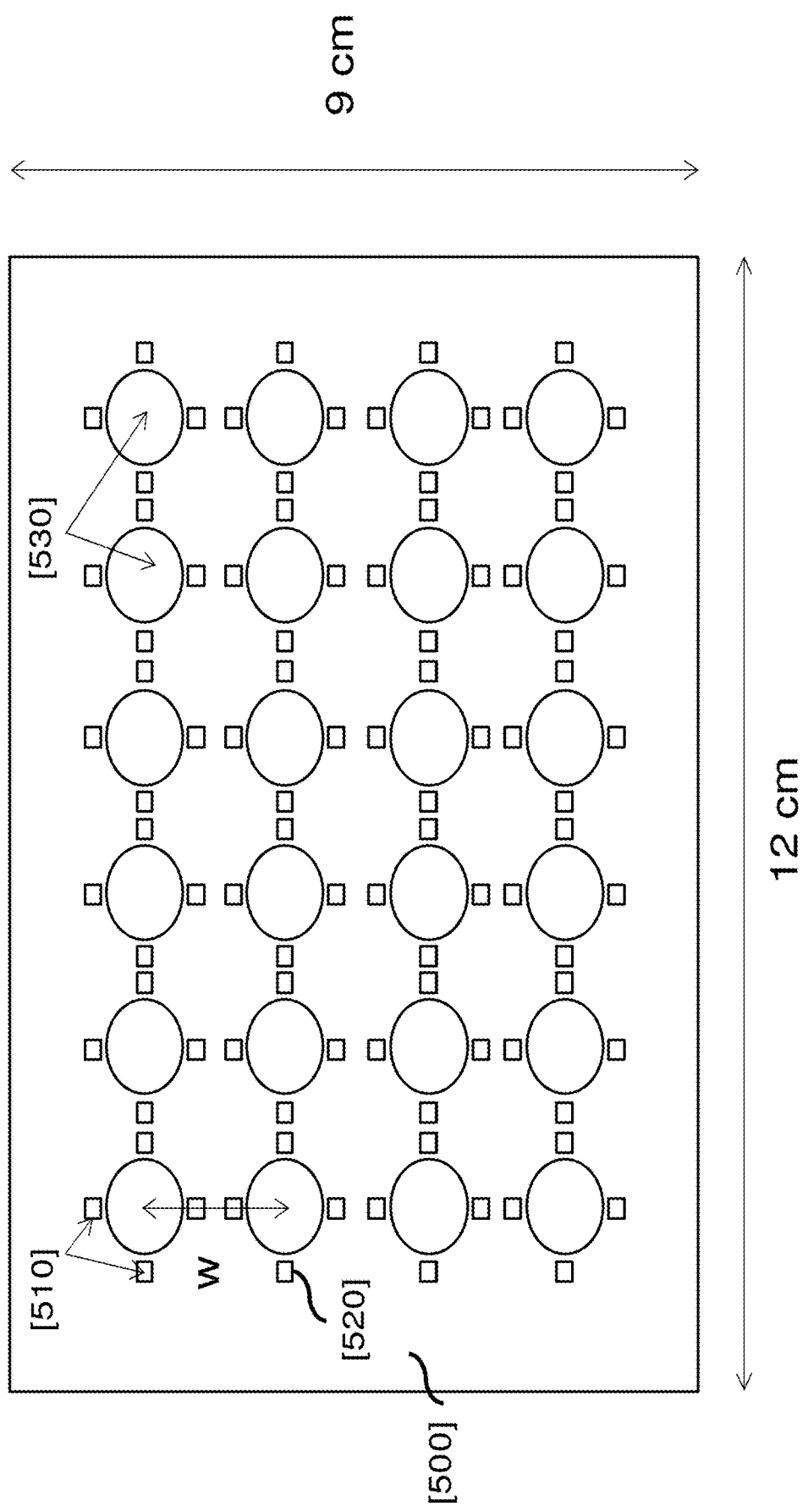
FIG. 5 is a bottom view of one embodiment of the patterned illumination system used by the present invention

A bottom view of one variation of a distribution of illumination sources, which comprise a variable illumination source, is shown in FIG. 5. This example variable illumination source is designed for a 4×6 array of micro-cameras, where each circle in the array marks the location of each micro-camera lens. Here, 4 illumination sources encircle the location of each micro-camera lens for a total of 96 illumination sources in the variable illumination source. For example, two illumination sources encircling one micro-camera in one corner of the micro-camera array are marked by [510], while one illumination source located adjacent to a micro-camera is marked by [520]. In one preferred embodiment, the illumination sources may be attached to a common PCB board [500], through which it is possible to electrically control each illumination source to turn it on/off, vary its intensity and/or vary its wavelength. In this embodiment, it is helpful to have holes or transparent windows in the PCB board, with one example hole marked by [530]. The holes and/or windows allow light to pass through the PCB board and into each micro-camera lens. The entire PCB board may be mounted on the micro-camera assembly, facing the object, such that each hole and/or window is centered on each micro-camera lens and allowing light to pass through all of the lenses in the micro-camera array. For example, the variable illumination source in FIG. 5 may be mounted on a 4×6 micro-camera array and positioned such that each hole [530] is centered on one micro-camera lens. Each of the 96 illumination sources in FIG. 5 may emit at a slightly different central wavelength of light, or emit at the same central wavelength with a particular subset of other illumination sources within the distribution of sources. We list a set of example parameters for the illumination sources in Table 2.

C. Data Acquisition with Variable Illumination

Figure 6:
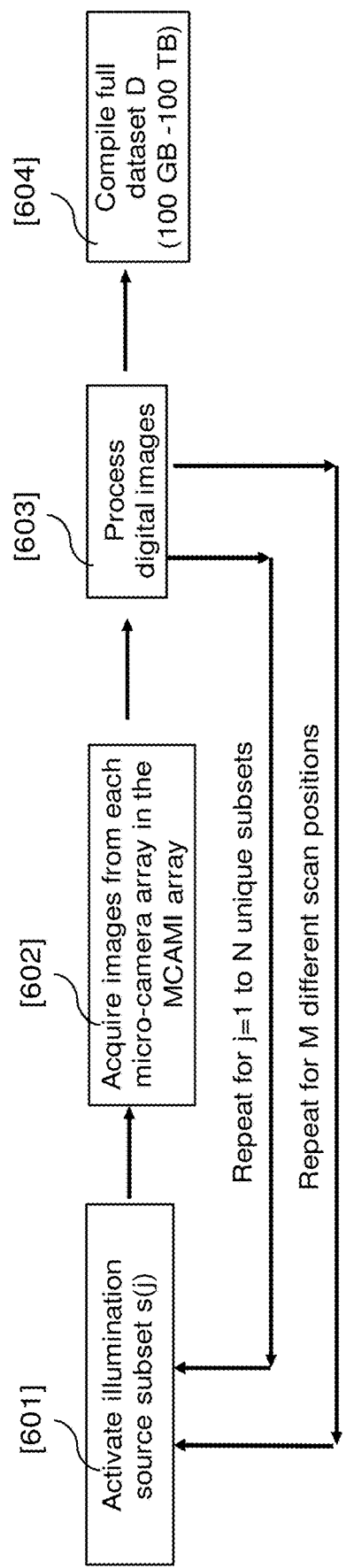
FIG. 6 is a flow diagram of one embodiment of the optical data acquisition and dataset formation steps of the present invention

One embodiment of the MCAMI data acquisition pipeline is presented in the flow chart in FIG. 6. In this particular embodiment, the MCAMI data acquisition activates one or more illumination sources over time to form an illumination source pattern, s. To achieve this, a particular subset of one or more illumination sources from within the distribution of illumination sources are activated (i.e., turned on to emit light) and the remainder of sources within the distribution of illumination sources are not activated. In an alternative embodiment, s may represent the spatial, angular and/or spectral distribution of a distribution of light that is incident upon the object of interest, which is also referred to as an illumination source pattern. In either case, the flow chart begins with the activation of the first illumination source pattern s(1) in [601]. While this illumination source pattern emits light that interacts with the object and then enters one or more micro-cameras, the MCAMI system will acquire one or more images from one or more micro-cameras within the array in [602]. Then, these images are processed by a processor in [603] and then added to comprise part of a dataset D in [604] which is located in computer memory. Example processing steps in [603] include but are not limited to indexing of each image, contrast adjustment, high dynamic range image formation, and image compression. These processing steps can be achieved on a general purpose CPU, a dedicated ASIC, an FPGA or an alternative computational device. The dataset can be compiled in RAM memory, within a hard drive or in server memory, for example.

The flow chart next returns back to step [601] to activate a different subset of illumination sources to create a second illumination pattern s(2). The position and spectral properties of the illumination pattern s(2) will be different than the illumination pattern s(1). Once again, images are captured, processed and saved. This loop is repeated N times for a set of N different image acquisitions in [602], where each acquisition of images is achieved while the object is under illumination from an illumination pattern s(j), for j=1 to N. In practice, N can range from anywhere between 1 and 10,000. Here, j is a counter variable that increases as the acquisition conditions are changed to denote the jth time that a particular subset of illumination sources is activated. Finally, if the micro-camera array is not imaging a continuous field-of-view of the sample, or if the entire sample does not fit within the field-of-view of the micro-camera array, then the sample and/or the camera array can be mechanically scanned to M different positions, where at each position the illuminate-and-capture process is again repeated N times. This process results in N×M unique acquisitions, which comprise the "full dataset" D. We note that this process of multi-angle, multispectral and multi-FOV image acquisition of a large dataset is similar in concept to the "registration" process of a physical unclonable function [Pappu1], in which a large amount of data is acquired from a physical object of interest.

D. Example Experimental Parameters

Here are some example numbers for the MCAMI data acquisition process. In one preferred embodiment, an example micro-camera array includes 96 individual CMOS sensors that are 10 megapixels each and arranged in a 8×12 grid. A single set of images from this micro-camera array with 96 cameras is 0.96 gigapixels (approximately 1 gigapixel). In this preferred embodiment, the micro-camera array follows a similar geometry as shown in FIG. 2, where the center of each micro-camera is separated by 18 mm from the center of adjacent micro-cameras. The FOV of each individual micro-camera in the array is approximately 2 cm×4 cm and the working distance to the object of interest is 14 cm. The magnification of each micro-camera is approximately ⅓, causing the FOV of each micro-camera in the array to partially overlap with the FOV of its immediate neighboring micro-cameras. This results in a total FOV (tFOV) of the example micro-camera array as approximately 30×30 cm.

In one preferred embodiment, it is possible to turn on 16 illumination sources at a time, selected from a total number of 384 illumination sources (4 or the illumination arrays shown in FIG. 4 put together, for example). A total of N=24 illumination patterns may be used, where each illumination pattern is created by turning on a set of 16 LEDs that have not been turned on previously. Furthermore, let us assume that the object of interest is semi-flat with a surface area of 120 cm×120 cm (e.g., a 120 cm×120 cm painting). This means that it is necessary to mechanically scan the artwork in a 4×4 grid and repeat acquisition M=16 times to image the entire object surface. In this example, the total acquired dataset D will be 0.96 gigapixels per acquisition×24 illumination pattern acquisition×16 scan positions=384 gigabytes in size. As a second example, let's assume the same numbers as above, but now the FOV of each micro-camera in the MCAMI system does not overlap with its neighboring micro-cameras and is ⅓ as large in each dimension (e.g., following the geometry shown in FIG. 3). Now, the sample must be scanned a small distance horizontally and vertically in a 3×3 pattern for the micro-camera array to image the entire sample surface within the 30×30 cm tFOV. In this case, 9 mechanical scans will be required to image the entire object surface. Thus, 144 total scan positions must be used, and the total acquired dataset D will be 1 gigapixel×24×144=3.46 terabytes in size.

E. Post-Processing into Cryptographic Keys

After the proposed invention acquires and forms a full dataset D (containing several to thousands of gigapixels), as shown in step [103] in FIG. 1, it is then post-processed into a set of random cryptographic keys, as shown in step [104] in FIG. 1. In one preferred embodiment of post-processing, an attempt is made to distill the full dataset D into a series of semi-random numbers that comprise one or more semi-random keys, where each semi-random key is matched to a particular illumination pattern (i.e., a particular set of sources) and a particular FOV location. This final set of semi-random keys and their associated illumination pattern/FOVs are somewhat analogous to the challenge-response pairs used in optical scattering-based PUFs [Pappu1], but now correspond to unique areas of a large and primarily flat object, include multispectral information, and are not necessarily acquired under coherent illumination.

Distillation is carried out in such a way that the semi-random keys are robust against errors or changes between successive measurements of the same object, but are still sensitive to imaging one object versus a different. In other words, the goal of the post-processing step in [104] is to create a set of random cryptographic keys that are unique to the object being measured, and will not change very much when the same object is measured under different experimental conditions that may include errors, but will change when the imaged object is different. Example errors here include optical shot noise, detector noise, electronic noise, position errors, as well as the potential effects of object aging (e.g., crack formation and dust accumulation across the surface of the object) and unexpected illumination variations. These errors may cause a mismatch between the originally acquired dataset and future measurements that are captured for authentication.

Figure 7:
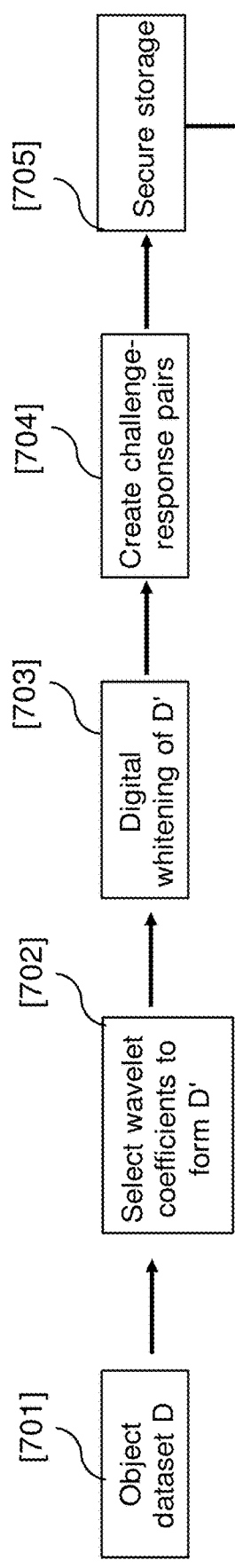
FIG. 7 is a flow diagram of one embodiment of the dataset post-processing steps (top) and key authentication steps (bottom) for the present invention
Figure 7:
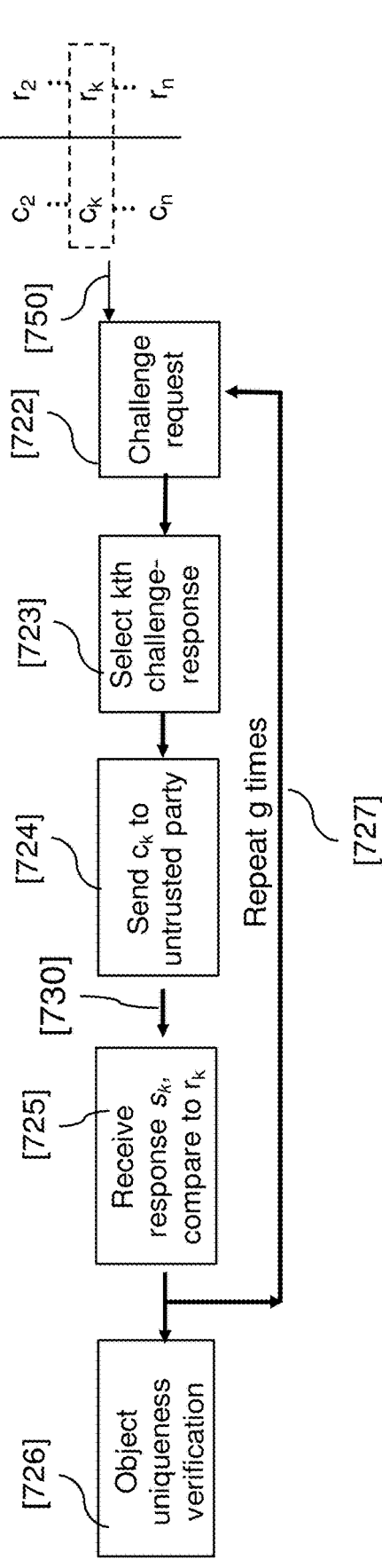

One preferred embodiment of dataset post-processing is presented in the flow chart shown in FIG. 7, which contains a detailed picture of the workflow steps [104] and [105] from FIG. 1. The full dataset D, saved in memory, first enters the workflow in step [701]. In one embodiment, it is also possible for only a certain part of the dataset D to enter the workflow in step [701]. In either case, in one embodiment, step [701] may first perform some elementary image processing steps such as image re-orientation and stretching, image denoising, and complex techniques like feature identification and extraction via the SIFT algorithm. These operations may be applied to one or more portions of the dataset D. In other words, the dataset D can be split into one or more smaller portions before applying post-processing steps.

Following the work in [Pappu1], post-processing may also involve taking the wavelet transform of one or more portions of the dataset D and selecting the largest wavelet coefficients from each wavelet transform. Large wavelet coefficients are relatively invariant to changes in position, orientation and the addition of noise, and may also be selected selectively to be invariant to the influence of dust and hairline cracks, which will primarily manifest themselves within a particular frequency/orientation band of wavelet space and can thus be partially filtered out. Thus, in one preferred embodiment, one or more portions of the dataset D will undergo a wavelet decomposition (i.e., is transformed into a wavelet basis) in [702] to form one or more smaller datasets D'. This wavelet transformation may either follow the wavelet transformation used in [Pappu1] or follow an alternative wavelet transformation. In either case, a select number of transformation coefficients are selected to send to step [703], where it is desirable to select transformation coefficients that do not vary much if the object is translated, or rotated, or if noise is added to the object image. In one embodiment, one may select the largest 10%-30% of the computed wavelet coefficients to form D' and send to step [703]. In another embodiment, one may select the largest 10%-30% of all Fourier transform coefficients to form D' and send to step [703]. In a third embodiment, one may select a number of locations of prominent features, determined with a feature detection algorithm, to form D' and send to step [703].

In either case, one or more smaller datasets D', each comprised of a set of transformation coefficients, are then processed by step [703] to create an array of values with high entropy. In one embodiment, this high-entropy array may be created with a digital whitening technique. For example, digital whitening can be achieved by using Von Neumann whitening, or alternatively by forming each D' into a vector and then multiplying this vector with a large random binary matrix as performed in [Horstmeyer]. In either case, digital whitening of each D' in step [703] creates one or more arrays of values that are smaller than each D' (in number of bits) but exhibits a higher per-bit entropy. Smaller datasets with increased entropy are easier to digitally save and offer approximately the same security as the original large, low-entropy datasets. For example, the whitened dataset may be 1-10% of the size of the low entropy dataset. These smaller, high-entropy datasets contain one or more random cryptographic keys.

In a fourth post-processing step in FIG. 7(a), marked [704], the one or more whitened arrays of values created in step [703] are then split into a set of challenge-response "key pairs". In one preferred embodiment, a challenge c(j) reflects the conditions under which a particular set of measurements were acquired by the MCAMI system, and each response reflects a set of measurements that were generated by its associated challenge. For example, in one preferred embodiment, one challenge may define one particular illumination pattern s(j) and a region of interest ROI(j) of the object, and the associated response will define the acquired and processed measurements of the object under illumination from the illumination pattern s(j) and from the region of interest ROI(j). In this case, c(j)=[s(j), ROI(j)]. In one preferred embodiment, the data format for a challenge may take the form of a list of instructions. In another preferred embodiment, the data format for a challenge can be a numerical key that defines one or more of the following: which illumination pattern was used, which region of interest of the sample was processed, the particular illumination sources used to record the response measurements, the power of each illumination source used to record the response measurements, the position of each illumination source used to record the response measurements, the one or more micro-cameras used capture the response measurements, the associated pixels of each micro-camera used to record the response measurements, and the types of post-processing used and the parameters used in each post-processing step. Furthermore, the jth response, r(j), is the one or more random cryptographic keys that were created from the data captured when the jth challenge was used with the MCAMI imaging system. A challenge-response key pair is formed by connecting c(j) and r(j) in secure storage (details provided below).

In one simplified example, let us assume that we form response 1, r(1), within the large dataset D by capturing and processing the image from the micro-camera 1, acquired under illumination from the first illumination source in the illumination array. Then, in one embodiment, challenge 1 will specify that s(1) is the first LED in the array, possibly with a vector s(1)[1 0 . . . 0], and that the region of interest ROI(1) is associated with the first micro-camera, possibly with a vector ROI(1)[1 0 . . . 0], such that the challenge c(1)=[s(1),ROI(1)]=[[1 0 . . . 0],[1 0 . . . 0]. In another embodiment, c(1) may be defined by the position and FOV of camera 1, as well as the position and spectral properties of the first illumination source used to capture the data for response 1. In any case, the challenge is defined such that it contains enough information for another party to use at a later date to recreate response 1 with the same object. It may also contain enough information for another party to use at a later date to recreate response 1 with the same object and a smaller MCAMI system (for example, using another MCAMI system that contains fewer micro-cameras). In practice, the instructions (i.e., challenges) may be more complex than this, but defined in such a way that a similar system to the original MCAMI system can automatically acquire this information in a simple and time-efficient manner. We discuss this scenario in more detail below.

F. Secure Storage

In a fifth post-processing step in FIG. 7(a), marked [705], the challenge-response pairs are securely stored in a digital database. This digital database may physically take the form of a digital storage medium such as a hard drive, solid state drive, a server, a USB thumb drive, random access memory or FPGA-based memory, for example. Independent of its physical form, one preferred embodiment of the format for digital storage of the challenge-response key pairs is to use a large table, which is sketched as [710] in FIG. 7. While it may be challenging to store the potentially large set of challenge-response pair keys in secure storage, in one preferred embodiment, the large set of challenge-response pair keys may be further encrypted using a standard encryption protocol. For example, an RSA encryption may be used to encode the large set of challenge-response pair keys, or they may be hashed with a checksum, such as an MD5 checksum. This additional layer of encryption can secure the large set of challenge-response key pairs with a smaller cryptographic key. This key can then be used to securely retrieve information from a potentially insecure database or a public channel (e.g., a public webpage).

The challenges for a particular object are stored in one table column and the responses for the same object are stored in another table column. Multiple tables, each associated with a different object, may be stored within the same digital database. Alternatively, the challenge-response key pairs for one or more objects may be stored as a linked list, structure, or class.

Furthermore, instead of directly storing the challenge-response key pairs within one particular location in memory, it is also possible to store the challenge-response key pairs across an entire network. For example, challenge-response key pairs may be stored within a distributed ledger, such as a blockchain, where the authenticity of the challenge-response key pairs are maintained within a peer-to-peer network. Alternatively, different portions of the challenge-response key pairs may be stored in different locations across a network, such that there is no particular way to access the entire collection of challenge-response key pairs without knowledge of all nodes within the network.

Independent of the exact format of storage, the challenge-response key-pairs are saved in such a way that it is possible to determine which challenge is associated with each response for a particular object. Furthermore, the challenge-response key-pairs are also saved in such a way that they can be securely accessed at a later date by a trusted party. In one preferred embodiment, secure access is accomplished via the use of a fuzzy commitment protocol (detailed below), as described in detail in [Dodis]. In short, by using a fuzzy commitment protocol, each response is mixed with a pseudo-random string and processed via an error-correction protocol before and after saving. The benefit of a fuzzy commitment-type protocol is to account for possible errors that arise between measurements used to form the challenge-response key pair and measurements obtained from the same object at a later date. In another preferred embodiment, the challenge and response pairs may be saved directly to digital memory without the use of a fuzzy commitment protocol. In a third preferred embodiment, another type of processing step may be used to remove potential errors (e.g., as outlined in [Yu]) that might arise between the first measured set of challenge-response key pair (e.g., between measurements made during object registration and subsequent measurements for object verification, as detailed next).

G. Authentication and Verification Process

In general, the challenge-response key pairs may be accessed by a party at a particular date to aid with a number of different objectives that concern an object of interest. For example, the challenge-response key pairs may be used as a means to fully characterize the optical properties of one or more objects at high resolution in a limited amount of time. Such a large amount of optical data can provide a means to comprehensively record the state of an object at a certain period of time, which may be beneficial in a conservation setting or to monitor the aging and variation of various types of artwork, documents or other historical artifacts. Alternatively, this type of characterization can be used to provide a certain degree of security regarding the object of interest.

In one preferred embodiment, object characterization may be used to obtain a measure of object uniqueness. In this scenario, a set of challenge-response response key pairs are obtained and securely stored for one object at one instance in time and at one location (e.g., Time and Location A, as in FIG. 7(a)). This is referred to as object registration. An MCAMI system may register one or more objects and securely store the challenge-response key pairs for one or more objects during object registration. Then, these challenge-response key pairs are used at a different instance in time and/or at a different location (e.g., Time and Location B, FIG. 7(b)) to compare to a new set of measurements of another object. Such comparison of measurements may take a variety of different forms. In one preferred embodiment, the challenge-response key pairs obtained at Time and Location A using one MCAMI system may be compared to the challenge-response key pairs obtained at Time and Location B using a second MCAMI system. If the two sets of challenge-response key pairs for a particular object are similar enough, then a certain degree of confidence is assigned to object of interest, such that the object of interest has been at both Time and Location A as well as Time and Location B. In a second preferred embodiment, one or more challenge-response key pairs obtained at Time and Location A using one MCAMI system may be compared to one more challenge-response key pairs obtained at Time and Location B using a second MCAMI system by computing an error metric. This error metric can assign a measure of distance (e.g., a mean-squared error or L1 error) between different challenge-response key pairs. If the error metric is below some threshold value, then a certain degree of confidence is assigned to object of interest, such that the object of interest has been at both Time and Location A as well as Time and Location B.

In another preferred embodiment, determination of object uniqueness may be carried out by a challenge-and-response scheme, as first described in [Pappu]. Here, we describe in detail one possible implementation of a challenge-and-response scheme. However, we note that the present invention may be used with a wide variety of challenge-and-response schemes to determine object uniqueness, and that the particular details provided below are meant for illustrative purposes. In general, the proposed system can operate with one of many security protocols that checks whether measurements of an object match those of the same object acquired and saved at an earlier date (e.g., as in a biometric security setting where fingerprints or irises must be matched to previously acquired examples). A major benefit of a challenge-and-response scheme is its ability to hide the majority of sensitive information about the object of interest from a multi-request attack, and also remain robust to variations between measurements acquired during the original object registration process (e.g., at Time and Location A) and then subsequently at the time of object verification (e.g., at Time and Location B).

Figure 8:
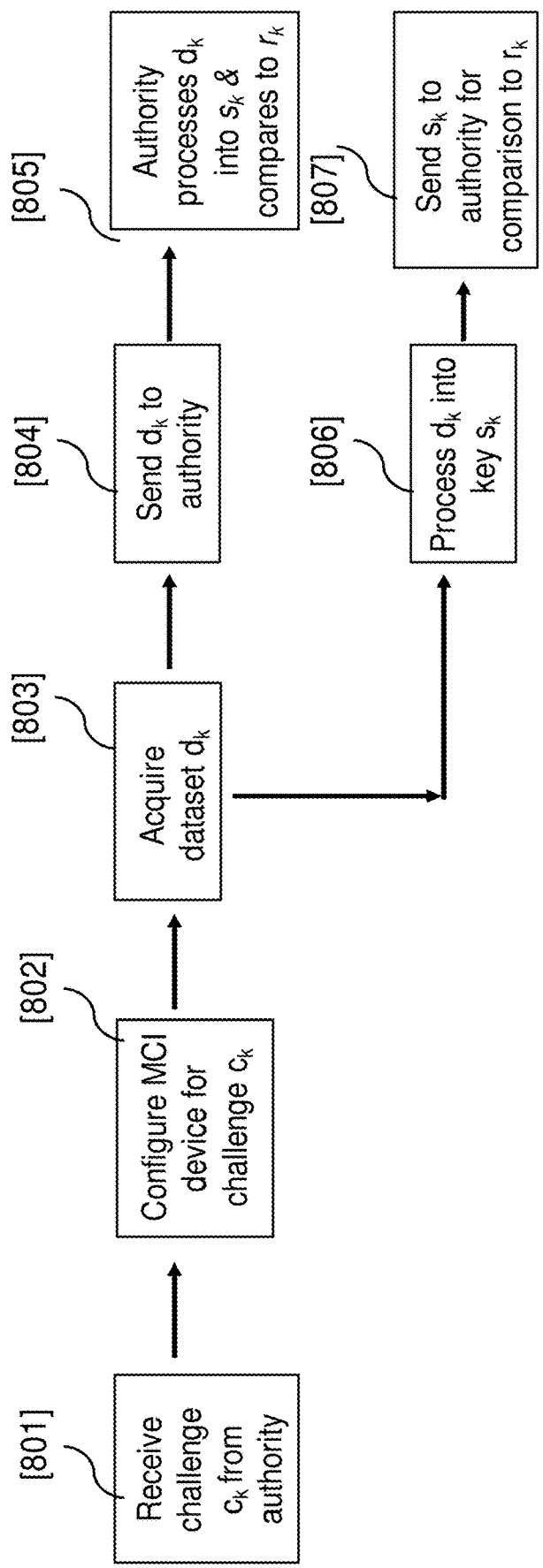
FIG. 8 is a flow diagram of one embodiment of the measurement and post-processing steps for creating a challenge-response cryptographic key pair

One preferred embodiment of a challenge-and-response scheme is diagrammed in the flow charts in FIG. 7(b) and FIG. 8. Here, we assume that a challenge-response key pair database has already been formed for one or more objects (e.g., following the steps in FIG. 7(a)). FIG. 7(b) outlines the steps for a challenge-and-response scheme that are required by the party that performs object verification, i.e., the "trusted authority" or the "verifier", who can access the challenge-response key pairs that are securely stored in the database.

The first step for the trusted authority in a challenge-and-response scheme is to receive a request in step [722] by an untrusted party, who may or may not hold the original object in question in their possession. In this request, which may be made via digital communication (e.g., an e-mail), the untrusted party asks the verifier (i.e., the trusted authority) to send them one or more challenges associated with one or more particular objects of interest. The untrusted party does not necessarily need to be co-located with the trusted party, nor have access to an MCAMI system, which we assume is located at a trusted node. As described above, the saved challenge is a set of instructions of how to obtain measurements of the object of interest, for example within a particular FOV and/or with a particular angular and spectral illumination source pattern. The trusted authority selects a particular challenge $c_k$ from the securely stored challenge-response table associated with the object of interest (step [723]). This kth challenge is within the challenge-response key pair table at [750]. In one preferred embodiment, the index k may be selected at random. Next, the trusted authority sends the challenge $c_k$ associated with the object of interest via a digital communication link to the untrusted party (step [724]). In one preferred embodiment, this communication can be performed via a private channel that an outside eavesdropper cannot easily monitor. In a second preferred embodiment, this communication can be performed via a public communication channel (e.g., a webpage).

Once the untrusted party receives the challenge $c_k$, the goal of the untrusted party is to acquire a limited dataset $d_k$ of the object that, when processed into a key $s_k$, can be used by the trusted authority to determine if the object of interest matches one or more objects that have challenge-response key pairs within the key database. The actions carried out by the untrusted party to generate the key $s_k$ are carried out at step [730] in FIG. 7(b). One detailed set of particular steps that the untrusted party can go through during step [730] are outlined in the flow chart in FIG. 8 and are detailed below. Independent of the particular steps that the untrusted party goes through, the end goal of their effort is to deliver a key $s_k$ to the trusted authority, shown as step [725]. In one preferred embodiment, delivery of the key $s_k$ can be performed via a private channel that is hard for an outside eavesdropper to monitor. In a second preferred embodiment, this communication can be performed via a public communication channel (e.g., a public webpage). In a third preferred embodiment, the untrusted party can send more than one key $s_k$ at a time during step [725].

Once the trusted authority receives the key $s_k$, it is possible to compare this newly generated key $s_k$ to the original response a produced by the kth challenge during object registration. If the new key $s_k$ matches the saved response $r_k$ up to a certain error threshold, then the trusted authority may increase their confidence that the object used to generate the key $s_k$ (i.e., the object of interest at Time and Location B). This increased confidence is used to make a final determination of object uniqueness in step [726], which can then be reported back to the untrusted party. If a certain level of confidence regarding object uniqueness is not met, then this entire process may be repeated via the loop [727] using different challenges and responses within the challenge-response key pair database.

As noted above, one preferred embodiment of how the untrusted party creates a key $s_k$ to test for object uniqueness is outlined in the workflow in FIG. 8. In general, the untrusted party acquires optical measurements from an object in their possession at Time and Location B to test for its uniqueness, and then processes these optical measurements into a limited dataset $d_k$. These optical measurements and processing steps take a very similar form to the optical measurements and processing steps used to create full dataset D (e.g., as shown in FIG. 1 step [103], FIG. 6 step [604] and FIG. 7 step [704]). In one preferred embodiment, the measurement and processing steps used to create the limited dataset $d_k$ follow the same steps used in FIG. 6 to process each full dataset D into a set of random challenge-response key pairs. In a second preferred embodiment, the processing steps used to process the measurements for the limited dataset $d_k$ follow the same processing steps used in FIG. 6 step [603], with the additional component of performing digital image alignment before the processing steps are executed.

Following the flow chart in FIG. 8, the first step [801] the untrusted party must take is to receive the kth challenge from the trusted authority. In one preferred embodiment, this challenge is received via private digital communication. In a second preferred embodiment, this challenge is received via a public channel. Once the challenge is received, the next step is to use the received challenge to configure a device to acquire optical measurements of an object of interest in [802]. Here, we now provide some details regarding the measurement device used by the untrusted party to acquire additional optical measurements. In one preferred embodiment, the untrusted party will use either the same MCAMI system used to capture the full dataset D for the object of interest, or a different MCAMI system with the same specifications as the MCAMI system used to capture the full dataset D for the object of interest, to acquire the optical measurements for the limited dataset $d_k$.

In a second preferred embodiment, the optical measurements for the limited dataset $d_k$ can be acquired by a separate micro-camera illumination device, here referred to as an MCI device. For example, this MCI device can consist of a single or several micro-cameras whose specifications match those for the micro-cameras used within the MCAMI system, as well as a fewer number of illumination sources than used within the MCAMI system. In general, an MCI device may take the form of a simpler MCAMI system that has less complex hardware, which may not necessarily acquire as large a number of measurements per snapshot as an MCAMI system, or whose measurements are not as high-resolution.

Figure 9:
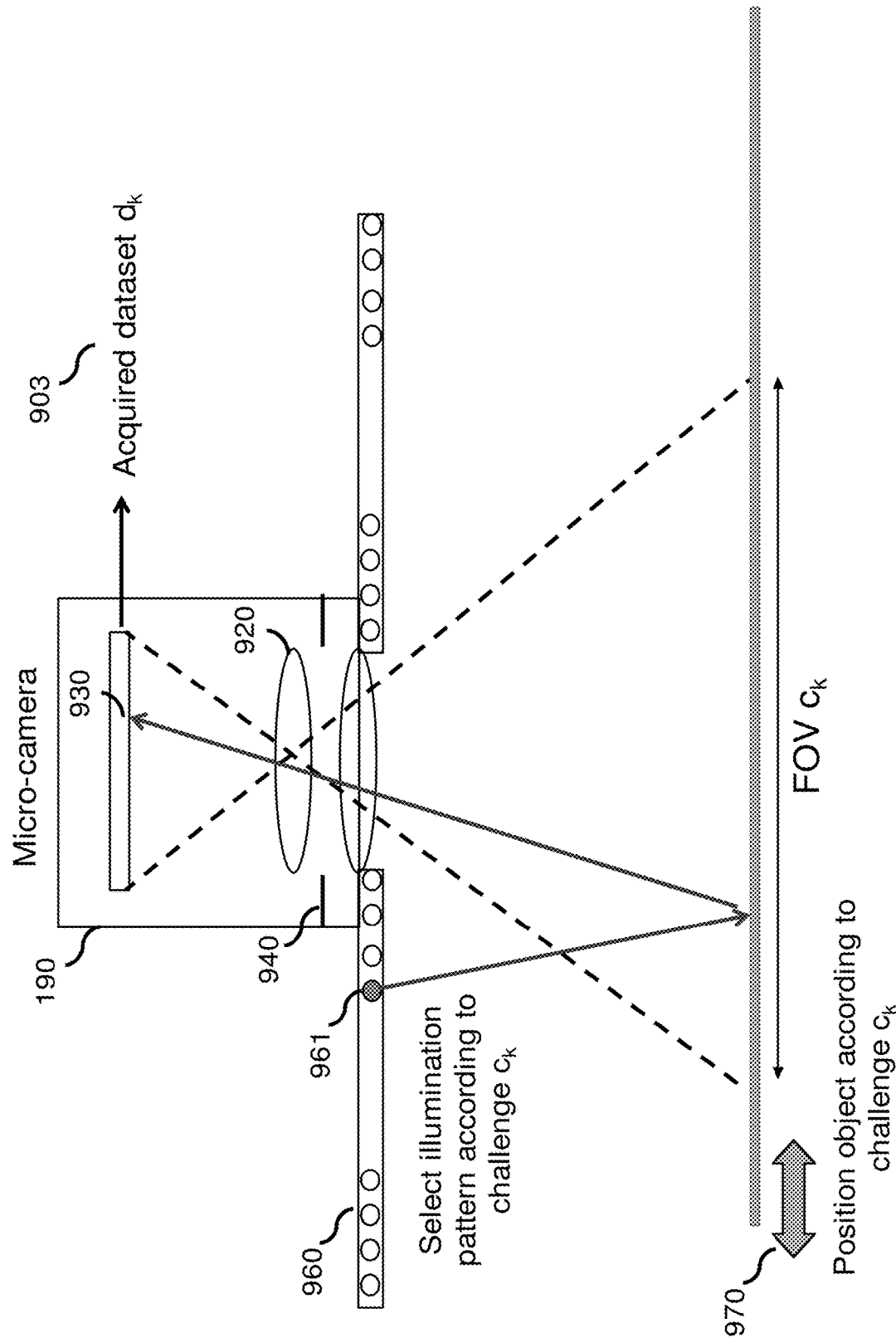
FIG. 9 is a side view of one embodiment of the optical measurement system used to obtain a limited amount of optical data for object authentication

In any case, an example of an MCI device is shown in FIG. 9. In practice, an MCI device may contain anywhere between 1 and 400 or more micro-cameras, but here is shown to contain 1 micro-camera for illustrative purposes. In one preferred embodiment, the MCI device can be positioned over a limited FOV of the object of interest (as specified by the challenge $c_k$) via mechanical positioning in [970] to acquire a limited dataset $d_k$, as shown in FIG. 9 step [903], which also corresponds to FIG. 8 step [803]. Data is acquired via illumination of the limited set of illumination sources marked in [960]. Here, we show one particular illumination source [961] as activated and illuminating the sample for illustrative purposes. In one preferred embodiment, this activated illumination source is specified by the kth challenge $c_k$ to be used to acquire the limited dataset $d_k$. In another preferred embodiment, both the activated illumination source and the FOV position are specified by the kth challenge $c_k$. Both of these are examples of step [802] in FIG. 8.

In any case, after the challenge is configured, the untrusted party will acquire optical measurements of the object of interest in step [803], which will produce a limited dataset $d_k$. Next, the untrusted party may take one of two steps. In one preferred embodiment, the untrusted party may send the limited dataset $d_k$ to the trusted authority (FIG. 8 step [804]), who then processes it to create a key $s_k$ (FIG. 8 step [805]). These digital processing steps will follow similar post-processing steps as used during the registration process to convert each dataset D into a set of responses (as shown in FIG. 7 steps [701] to [704]). In one preferred embodiment, the processing steps can be performed on computing device hardware that matches the MCAMI system hardware. Once the limited dataset $d_k$ from the untrusted party has been processed into the new key $s_k$ from the untrusted party, this new key $s_k$ can then be compared to the original response $r_k$ to produce a level of confidence regarding object uniqueness. As described above, this comparison checks if the new key $s_k$ matches the saved response a up to a certain error threshold. If so, then the trusted authority may increase their confidence that the object used to generate the key $s_k$ (i.e., the object of interest at Time and Location B). This increased confidence is used to make a final determination of object uniqueness in FIG. 7 step [726], which can then be reported back to the untrusted party. If a certain level of confidence regarding object uniqueness is not met, then this entire process may be repeated via the loop [727] using different challenges and responses within the challenge-response key pair database.

Alternatively, in another preferred embodiment, the untrusted party may process the limited dataset $d_k$ into a key $s_k$ before sending any information to the trusted authority. This case is shown in FIG. 8 as proceeding from step [803] to step [806]. In this scenario, the untrusted party may use similar processing steps as used during the registration process to convert each dataset D into a set of responses (as shown in FIG. 7 steps [701] to [704]), to instead now process the limited dataset $d_k$ into a key $s_k$. In this embodiment, the key $s_k$ may then be sent to the trusted authority via a private communication channel to the trusted authority, who will then compare the key $s_k$ to the saved response $r_k$ to produce a level of confidence regarding object uniqueness.

Although particular embodiments of the present inventions have been shown and described, it will be understood that it is not intended to limit the present inventions to the preferred embodiments, and it will be obvious to those skilled in the art that various changes and modifications may be made without departing from the spirit and scope of the present inventions. Thus, the present inventions are intended to cover alternatives, modifications, and equivalents, which may be included within the spirit and scope of the present inventions as defined by the claims.

INDUSTRIAL APPLICABILITY

The invention has been explained in the context of several embodiments already mentioned above. There are a number of commercial and industrial advantages to the invention that have been demonstrated. These include the ability to image large objects at microscopic resolution using a compact system that does not need any moving parts, the ability to acquire many gigabytes of optical image data in an efficient amount of time, the ability to use variable illumination to capture additional optical measurements from objects of interest, and the ability to post-process these optical measurements into cryptographic keys. The invention also provides in varying embodiments additional commercial benefits like the ability to use its generated cryptographic keys for object authentication and/or to determine object uniqueness, to characterize objects with multi-gigabyte datasets, to aid in the process of forgery detection, and to monitor the change of objects over time at a microscopic level, to name a few.

While the invention was explained above with reference to the aforementioned embodiments, it is clear that the invention is not restricted to only these embodiments, but comprises all possible embodiments within the spirit and scope of the inventive thought and the following patent claims.

CITATION LIST

Patent Literature

[Fraser] J. Fraser and L. Weber, Authentication method and system, U.S. Pat. No. 9,251,634B1 (2002).

[Jung]: L. Jung et al., Dna marking of previously undistinguished items for traceability, US Patent Application 20140272097A1

[Kwok] T. Kwok et al., Methods for authenticating articles with optical reporters, U.S. Pat. No. 8,426,216B2

[Colineau] J. Colineau et al., Method for optical authentication and identification of objects and device therefor, US Patent US 20060104103 A1

[Cowburn] R. Cowburn et al., Optical Authentication, U.S. Pat. No. 7,812,935 B2

[Rhoads] G. B. Rhoads and T. F. Rodriquez, Capturing physical feature data, U.S. Pat. No. 8,077,905 B2

[Alfano] R. R. Alfano and Y. Pu, Spatial frequency spectrometer for and method of detection of spatial structures in materials, U.S. Pat. No. 9,804,088B2

[Balas] K. Balas and D. Pelecoudas, Imaging method and apparatus for the non-destructive analysis of paintings and monuments, U.S. Pat. No. 7,042,567B2

[Sharma] A. Sharma et al., System, method and computer-accessible medium for authenticating physical objects using microscopic textures, U.S. Pat. No. 9,759,902B2

[Horstmeyer] Multiple camera microscope imaging with patterned illumination, PCT Patent PCT/US 2017/024610

[Pappu2] R. Pappu et al., "Identification and verification using complex, three-dimensional structural features", U.S. Pat. No. 6,584,214

[Prokoski] F. Prokoski, "Method and apparatus for alignment, comparison and identification of characteristic tool marks, including ballistic signatures," U.S. Pat. No. 8,090,223

Non-Patent Literature

[Crilly] Crilly R. The ten most expensive paintings in history. The Telegraph. 12 May 2015. Available: http://www.telegraph.co.uk/news/worldnews/northamerica/usa/11596376/The-ten-most-expensive-paintings-in-history.html.

[Khandekar] Khandekar N, Carol M-U, Cooper H Rosenberger C, Eremin K, Smith K, et al. A technical analysis of three paintings attributed to Jackson Pollock. Stud Conserv. 2010; 55: 204-215

[Ragai] Ragai J. The Scientific Detect on of Forgery in Paintings. P Am Philos Soc. 2013; 157: 164-175.

[Dantzig] M. M. van Dantzig. Pictology: An Analytical Method for Attribution and Evaluation of Pictures. E. J. Brill, Leiden, Netherlands, 1973.

[Riederer] Josef Riederer. The detection of art forgeries with scientific methods. In Forensic science progress, pages 153-168. Springer, 1986.

[Elgammal] A. Elgammal et al., "Picasso, Matisse, or a Fake? Automated analysis of drawings at the stroke level for attribution and authentication," arXiv:1711.03536v1

[Strezowski] G. Strezowski and M. Worring, "OmniArt: Multi-task Deep Learning for Artistic Data Analysis," arXiv:1708.00684v1 (2017), available here: https://arxiv.org/pdf/1708.00684

[Dong] J. Dong, A. Locquet, M. Melis and D. S. Citrin, "Global mapping of stratigraphy of an old-master painting using sparsity-based terahertz reflectometry," Nature Sci. Rep. 7, 15098 (2017)

[Hwang] S. Hwang et al., "Optical measurements of paintings and the creation of an artwork database for authenticity," PLOS One (2017).

[Ruhrmair] U. Ruhrmair et al., "On the foundations of physical unclonable functions", IACR Cryptology ePrint Archive (2009). Available here: https://eprint.iacr.org/2009/277.pdf

[Pappu1] R. Pappu et al., "Physical one-way functions," Science 297 (2002)

[Horstmeyer] R. Horstmeyer, "Physical key-protected one-time pad," Sci. Reports (2013)

[Dodis] Y. Dodis et al., "Fuzzy extractors: How to generate strong keys from biometrics and other noisy data," *Proc. EUROCRYPT* 2004 3027, 523-540 (2004).

[Yu] M. Yu and S. Devadas, "Secure and robust error correction for physical unclonable functions," *IEEE Des. Test Comput.* 27, 48-65 (2010).

What is claimed is:

1. An optical system, comprising:
multiple micro-camera imaging devices mechanically coupled to each other, each micro-camera imaging device configured to acquire one or more optical images of a distinct region of an object;
an illumination source comprising one or more optical sources, each optical source configured to provide an optical illumination to the object; and
a processor,
wherein the processor is configured to convert optical images acquired by the more than one micro-camera and under the optical illumination sent by the one or more optical sources into an object dataset,
wherein the processor is configured to convert the object dataset into one or more cryptographic keys.

2. The optical system of claim 1,
wherein information regarding the optical images, the one or more cryptographic keys or the optical illumination is configured to provide a measure of authentication.

3. The optical system of claim 1,
wherein the combination of the optical system and object is configured to form a physical unclonable function (PUF).

4. The optical system of claim 1,
wherein the multiple micro-camera imaging devices and the illumination source are mechanically coupled to each other.

5. The optical system of claim 1,
wherein at least two optical sources of the one or more optical sources are configured to illuminate the object with different wavelengths of light.

6. The optical system of claim 1, further comprising a digital communication link to send and receive information to another party regarding the one or more cryptographic keys or the optical illumination used to generate the optical images from which the one or more cryptographic keys are derived.

7. The optical system of claim 1,
wherein the processor comprises a processing circuitry contained on a field-programmable gate array (FPGA).

8. The optical system of claim 1,
wherein the processor is configured to store the one or more cryptographic keys with information regarding the optical illumination used to generate the optical images from which the one or more cryptographic keys are derived.

9. The optical system of claim 1,
wherein the processor is configured to receive a request from another party to repeat acquiring optical images of the object under a different type of optical illumination.

10. The optical system of claim 1,
wherein the object dataset is converted from a plurality of optical images,
wherein the plurality of optical images comprise multiple optical images acquired by the multiple micro-camera imaging devices with the optical illumination varied between each acquisition.

11. The optical system of claim 1,
wherein the object dataset is converted from a plurality of optical images,
wherein the a plurality of optical images comprise multiple optical images acquired by the more than one micro-camera imaging devices under multiple optical illumination comprising different wavelengths of light.

12. The optical system of claim 1,
wherein the object dataset is converted from a plurality of optical images,
wherein the a plurality of optical images comprise multiple optical images acquired by the more than one micro-camera imaging devices with the object physically scanned to more than one location.

13. The optical system of claim 1,
wherein the one or more cryptographic keys are configured to provide a measure of object uniqueness by being compared to newly generated one or more cryptographic keys from optical images acquired at a later time or by being compared to one or more stored cryptographic keys.

14. The optical system of claim 1,
wherein the one or more cryptographic keys are configured to provide a measure of authentication by being compared to different one or more cryptographic keys using an authentication protocol.

15. The optical system of claim 1,
wherein the one or more cryptographic keys are configured to provide a measure of authentication by being compared to different one or more cryptographic keys using a challenge-and-response scheme.

16. The optical system of claim 1,
wherein the one or more cryptographic keys are compared to one or more stored cryptographic keys to provide information on changes to the object,
wherein the changes to the object comprise at least one of damage, use, or fading of material properties over time.

17. An optical system, comprising:
multiple micro-camera imaging devices,
wherein each micro-camera imaging device is configured to acquire one or more optical images of a distinct region of an object;
an illumination source,
wherein the illumination source comprise one or more optical sources,
wherein each optical source is configured to provide an optical illumination to the object; and
a processor,
wherein the processor is configured to generate one or more cryptographic keys based on optical images acquired by the multiple micro-camera imaging devices and under the optical illumination provided by the one or more optical sources,
wherein the one or more cryptographic keys are configured to be compared with one or more stored cryptographic keys to authenticate the object.

18. The optical system of claim 17,
wherein the object dataset is converted from a plurality of optical images,
wherein the plurality of optical images comprise multiple optical images acquired by the multiple micro-camera imaging devices with the optical illumination varied between each acquisition with different wavelengths of light with the object physically scanned to more than one location.

19. The optical system of claim 17,
wherein the authentication further comprises information related to the optical illumination.

20. An optical system, comprising:
more than one micro-camera imaging devices mechanically coupled to each other, each micro-camera imaging device configured to acquire optical images of a distinct region of an object;
an illumination source containing one or more optical sources, each optical source configured to send an optical illumination to the object; and
a processor configured to generate one or more dataset keys based on the optical images acquired by the more than one micro-camera and under the optical illumination sent by the one or more optical sources,
wherein the one or more dataset keys are configured to provide a measure of authentication for the object.

21. The optical system of claim 20,
wherein the processor is configured to store the one or more dataset keys,
wherein the measure of authentication can be obtained by comparing the stored one or more dataset keys with newly acquired one or more dataset keys.

22. The optical system of claim 20,
wherein the processor is configured to authenticate the object by comparing the one or more dataset keys with one or more stored dataset keys.

* * * * *